(12) United States Patent
Reuter

(10) Patent No.: US 6,383,233 B1
(45) Date of Patent: May 7, 2002

(54) SEPARATION PROCESS

(75) Inventor: Karl Reuter, Freiburg (DE)

(73) Assignee: Reuter Chemicscher Apparatebau KG (DE)

(*) Notice: Subject to any disclaimer, the term of this patent is extended or adjusted under 35 U.S.C. 154(b) by 0 days.

(21) Appl. No.: 09/142,501

(22) PCT Filed: Mar. 7, 1997

(86) PCT No.: PCT/IB97/00208

§ 371 Date: Jan. 19, 1999

§ 102(e) Date: Jan. 19, 1999

(87) PCT Pub. No.: WO97/32644

PCT Pub. Date: Sep. 12, 1997

(30) Foreign Application Priority Data

Mar. 10, 1996 (EP) .............................. 96200654

(51) Int. Cl.⁷ .............................. B01D 9/00; C13K 1/10; C30B 17/00; C07C 7/14
(52) U.S. Cl. ........................ 23/295 R; 23/301; 585/812; 585/816
(58) Field of Search .............................. 23/295 R, 301; 585/812, 816

(56) References Cited

U.S. PATENT DOCUMENTS 3,364,690 A  1/1968  Torobin ........................ 62/58
3,643,453 A  2/1972  Groothuis et al. ............. 62/58
4,995,900 A * 2/1991  Futcher ......................... 71/92
5,872,259 A * 2/1999  Reuter ..................... 548/267.8

FOREIGN PATENT DOCUMENTS

| DE | 1519790 | 4/1971 |
| EP | 548028 | 6/1993 |
| GB | 1255346 | 12/1971 |
| WO | WO9419101 | 9/1994 |

* cited by examiner

Primary Examiner—Steven P. Griffin
Assistant Examiner—Jonas N. Strickland
(74) Attorney, Agent, or Firm—Burns, Doane, Swecker & Mathis, LLP

(57) ABSTRACT

A process is described for separating a desired substance from an aggregate mixture in which process a three-phase dispersion is formed, the first phase comprising droplets phase comprising a liquid transport phase, and the third phase comprising a surface upon which the desired substance can crystallize, whereby a chemical potential exists for crystal growth of the desired substance in the third phase thereby creating a flow of the desired substance from the first phase through the second phase to the third phase where the desired substance crystallizes, characterized in that the Gibb's free enthalpy of formation ($\Delta G$) of the droplets is <0.

10 Claims, 1 Drawing Sheet

SEPARATION PROCESS

Figure 1:
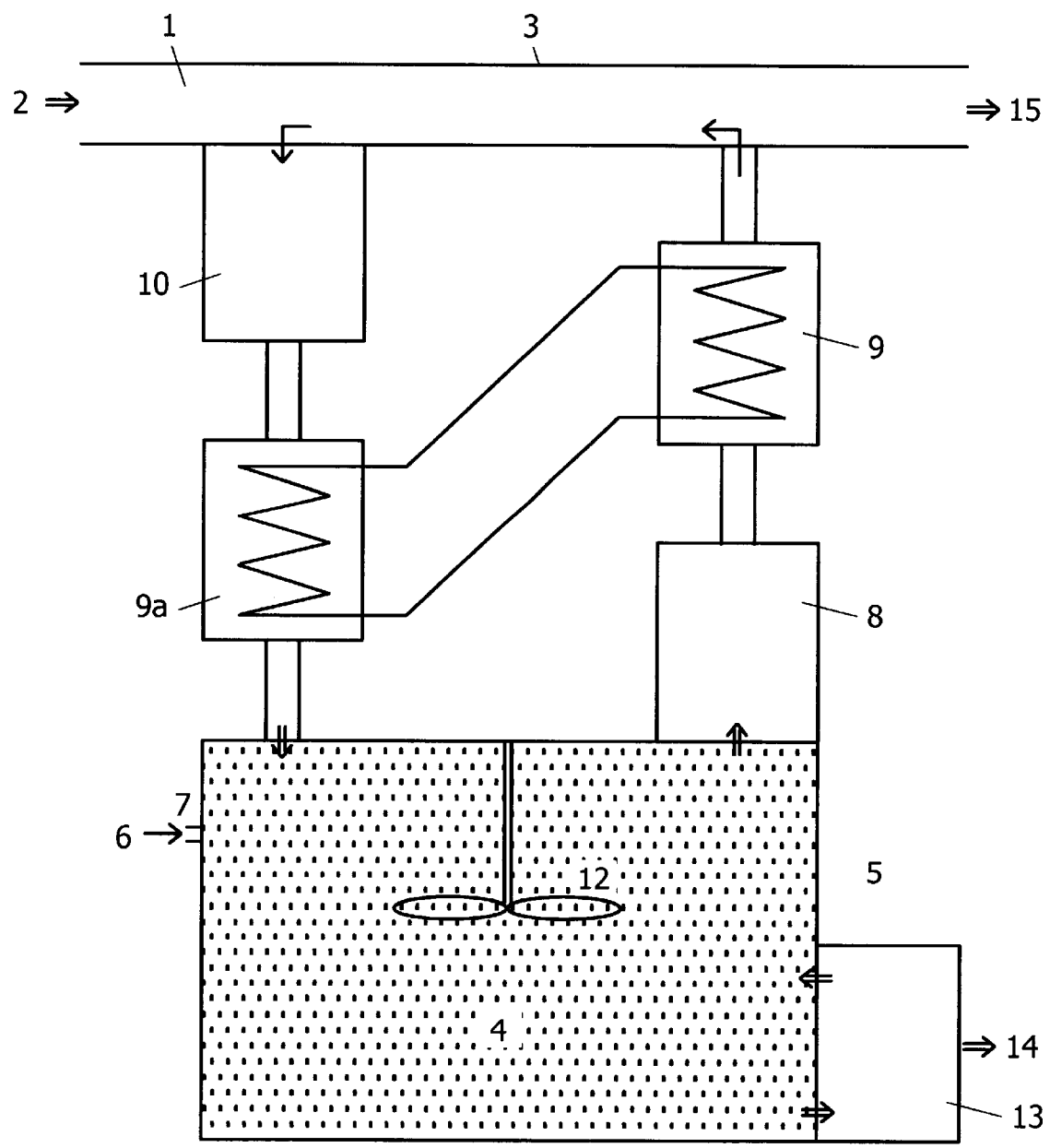

The invention described herein is in the field of separation processes and relates particularly to a crystallisation process for separating a desired substance from an aggregate mixture of substances.

BACKGROUND OF THE INVENTION

Conventional crystallisation involves the saturation of a solvent with a solid material, followed by the induction of supersaturation by lowering the temperature or by evaporation of solvent. The crystallisation velocity can be influenced by the rate of cooling or evaporation, i. e. by the degree of distortion of the thermodynamic equilibrium.

The crystallisation rate—or in equilibrium stage the rate of exchange of molecules at the crystal surface—is very high in a conventional crystallisation process and the probability that a "wrong" molecule gets trapped by other molecules is considerable. Therefore, the conventional crystallisation process reflects only to a very limited extent the maximum possible differences in adsorption energies of different molecules on a certain crystal surface, as is sometimes the case with optimised chromatographic processes, and to a certain extent a highly dynamic situation of "trapping molecules" by the layers of the crystal that successively form.

The purification of mixtures of compounds by emulsion crystallisation is known. In emulsion crystallisation processes, mixtures are purified by forming emulsified droplets of the mixtures and then adding seed crystals of one component of the mixture to thereby selectively crystallise that component, or by cooling the emulsion to induce crystallisation (c.f. EP 0 548 028 Al; Davey et al., Nature, Vol. 375, pp. 664–666 (Jun. 22, 1995); I. Holéci, Chemicky průmysi 14/39, pp. 638–641 (1964)).

Though these emulsion crystallisation processes are effective, they possess certain disadvantages. First, the formation of the emulsions requires high-shear equipment, which can be undesirable from a processing standpoint. Second, as the emulsions tend to be thermodynamically unstable, the emulsion droplets tend to coalesce or "oil out". In addition, the droplet size contemplated (typically 0.5–50 μm) is large enough to allow undesirable spontaneous crystallization within the droplet with certain types of mixtures.

DETAILED DESCRIPTION OF THE INVENTION

The crystallisation process described herein is directed to a process for separating a desired substance from an aggregate mixture in which process a three phase dispersion is formed, the first phase comprising droplets containing the aggregate mixture, the second phase comprising a liquid transport phase, and the third phase comprising a surface upon which the desired substance can crystallise, whereby a chemical potential exists for crystal growth of the desired substance in the third phase thereby creating a flow of the desired substance from the first phase through the second phase to the third phase where the desired substance crystallises, characterised in that the Gibb's free enthalpy of formation ($\Delta G$) of the droplets is <0. Such droplets form spontaneously, are thermodynamically stable and are small enough to prevent spontaneous crystallisation within them.

The first and second phases of the process according to the present invention together form what is known in the art as a microemulsion. Microemulsions provide the significant advantage that their droplets are typically transparent which facilitates observing and monitoring each specific crystallization process.

In addition, the droplets of a microemulsion provide an interface between the first and second phases having a significantly increased surface in comparison to macroemulsions. Larger surface areas enable higher flow rates of substance from the first to the second phase, and thereby, higher rates of crystallization. Higher crystallization rates are advantageous from the standpoint of the scale-up and commercialization of a process.

The process according to the present invention may be carried out in batch or continuous operation.

"Desired substance" as used herein, refers to inorganic and organic substances having a melting point above $-130°$ C., preferably above $-78°$ C., more preferably above $-20°$ C. The process of this invention is especially indicated for those substances that have been traditionally difficult to purify, e.g. constitution isomers, stereo isomers i.e. cis/trans isomers, diastereomers, enantiomers etc. and homologues. The desired substance can be a pharmaceutical, an agrochemical, a fragrance, a food additive, a chemical intermediate or the like.

"Aggregate mixture" as used herein refers to a mixture containing the desired substance and one or more impurities. The aggregate mixture may be a liquid or a solid, or a liquid and a solid. The aggregate mixture may be optionally dissolved or dispersed in one or more solvents. Droplets of the aggregate mixture are typically formed with the aid of one or more alcohols, whereby the alcohol may be added externally to the dispersion, or may be contributed by the aggregate mixture itself.

In addition, formation of droplets may also be aided by one or more surface active agents, hereinafter described. The surface active agents may be added externally to the dispersion, or may be contributed by the aggregate mixture itself.

The droplets will have a diameter of less than 500 nm, and preferably less than 200 nm, e.g. 5–200 nm. Droplets of this dimension create in a dispersion what is commonly referred to in the art as a microemulsion.

Due to the Gibb's free enthalpy of formation ($\Delta G$) being <0, the droplets will form spontaneously in the second phase, hereinafter described. Formation of these droplets may, however, be accelerated through the use of agitation, e.g. gentle stirring, shaking, pumping or ultrasound.

It is to be understood that the aggregate mixture nay contain one or more desired substances. The desired substances may, according to choice, be separated from the aggregate mixture either individually or simultaneously.

The second phase of the system, which functions as a transport phase through which the desired substance flows before crystallising onto the third phase, is liquid and will be selected based upon the solubility characteristics, nucleation characteristics and the selectivity of the crystallisation process for the desired substance. Preferably the desired substance will be less soluble in the second phase than in the first phase.

In such cases where the desired substance is water insoluble or substantially water insoluble, the second phase is conveniently polar and hydrophilic.

The second phase may further contain an-agent for adjusting the solubility of the desired substance in the second phase and/or the freezing point of the second phase. In such cases where the second phase is water, such agent is conveniently a water soluble inorganic salt such as $CaCl_2$, NaCl, KCl, MgCl$_2$ AlCl$_3$, or a water-miscible organic liquid such as an alcohol, ether, ketone, ester, lactone, dimethylsulfoxide (DMSO) and acetonitrile. Water-miscible organic liquids are preferred.

Below is set forth a list of suitable solvents and solvent additives to be used in the first phase or the second phase.

I. Non-polar, lipophilic solvents and additives having a water solubility of $\leq 5\%$ v/v at room temperature (hereinafter "r.t.") include:
1. Alkanes such as n-, i- or branched of the general formula —(C$_n$H$_{2n+2}$)— including polyethylenes, polypropylenes, cycloalkanes (e.g. cyclopentane, cyclohexane);
2. Alkenes such as n-, i- or branched of the general formula —(C$_2$H$_{2n}$)— including cycloalkenes (cyclohexene, terpene), di- or polyalkenes;
3. Alkines such as n-, i- or branched of the general formula —(C$_n$H$_{2n-2}$)—, cycloalkines, di- or polyalkines;
4. Aromatics such as unsubstituted aromatics (e.g. benzene, naphthalene), substituted aromatics such as alkylated aromatics (e.g. toluene, xylene, higher alkylated benzenes, alkylated naphthalenes), heterosubstituted aromatics such as halogenated (e.g. chlorobenzene, hexafluorobenzene) and/or nitrated (e.g. nitrobenzene), heteroaromatics such as pyridine, furane, thiophene, and polymers such as polystyrene;
5. Mineral-, synthetic-, crop- and/or silicone oils (e.g. Castor oil, methyloleate, polysiloxane);
6. Halogenated hydrocarbons such as CH$_2$Cl$_2$, CHCl$_3$, CCl$_4$, trichloroethane, trichloroethene, polyvinylchloride;
7. CS$_2$, CO$_2$;
8. Ethers such as n-, i- or branched of the general formula (C$_n$H$_m$)O(C$_x$H$_y$) with total C$\geq$4 (e.g. diethylether, tert-butyl methylether (TBME);
9. Aldehydes such as n-, i- or branched of the general formula C$_n$H$_m$CHO with total C$\geq$4.
10. Ketones such as (C$_n$H$_m$)CO(C$_x$H$_y$) with total C$\geq$6 (e.g. 2-hexanone, methyl-t-butylketone) or cycloketones with approx. C$\geq$6;
11. Esters such as n-, i- or branched of the general formula (C$_n$H$_m$)COO(C$_x$H$_y$) with total C$\geq$5, diesters such as di(-methyl- isodecyl-, -isodecyl-, -isotridecyl-) phthalate, diesters of carbonic acid, triesters such as oils and fats, and polyesters;
12. Amides such as N-,N-dimethyl laurylamide, and polyamides;
13. Lactames such as (N-octyl-, N-dodecyl-)pyrrolidone;
14. Alkanoles, alkenoles, alkinoles, aromatic and cyclic alcohols such as n-, i-, branched or cyclic of the general formula (1,2, . . . ) (C$_n$H$_m$)OH with total C$\geq$5 (e.g. 2-hexanol, cyclohexanol, benzylalcohol and terpinol);
15. Primary, secondary and tertiary amines e.g. n-, i- or branched of the general formula (1,2, . . . ) (C$_n$H$_m$)NH$_2$ with total C$\geq$6 (e.g. dodecylamine);

II. Amphiphilic solvents, soluble in both non-polar, lipophilic and polar, hydrophilic phases with a water solubility of >5% v/v at r.t. and a solubility of >5% v/v at r.t. in methyloleate include:
1. Ethers such as tetrahydrofurane (THF), polyethers such as (dimethoxyethane (DME), dioxane, trioxane, polyethylene glycol (PEG), polypropylene glycol (PPG);
2. Alcohols such as n-,i-, cyclo- or branched of the general formula (1,2, . . . ) (C$_n$H$_m$) OH with total C$\leq$5 (e.g. isopropanol, isobutanol, cyclobutanol, cyclopentanol), aromatic alcohols such as phenol, furfurylalcohol, diols such as propyleneglycol, butanediol, hydrochinone or polyols;
3. Aminoalcohols such as ethanolamine, diethanolamine, triethanolamine;
4. Primary, secondary and tertiary amines such as n-, i- or branched of the general formula (1,2, . . . )(C$_n$H$_m$) NH$_2$ with total C$\leq$7 (aniline, cyclohexylamine, pyridine, morpholine), polyamines;
5. Aldehydes with total C$\leq$3 (e.g. formaldehyde, acetaldehyde);
6. Ketones such as n-, i- or branched of the general formula (C$_n$H$_m$) CO (C$_x$H$_y$) or cyclic ketones with total C$\leq$6 (acetone, 2-butanone, cyclohexanone);
7. Esters such as n-, i- or branched of the general formula (C$_n$H$_m$) COO (C$_x$H$_y$) with total C$\leq$4, di-, triesters ethylenglycoldiacetate, dimethyladipiate, dimethylglutamate, dimethylsuccinate, trimethylphosphate);
8. Lactones such as γ-butyrolactone;
9. Amides such as formamide, dimethyl formamide (DMF), acetamide;
10. Lactames such as (N-methyl-, N-ethyl-, N-isopropyl-, N-hydroxyethyl-) pyrrolidone;
11. Other heterocyclic compounds such as imidazoles, triazoles;
12. Carbon-acids such as n-, i- or branched of the general formula C$_n$H$_m$COOH with total C$\leq$5.

III Polar, hydrophilic solvents or solvent additives with a solubility of $\leq$5% v/v in methyloleate include:
1. Water;
2. DMSO;
3. Di- or polycarbonic acids (e.g. oxalic acid, tartaric acid);
4. selected di- or polyalcohols (e.g. ethanediol, glycerine, PVA);
5. Amino acids;
6. Sugars.

IV. Chiral solvents and additives include: camphene, menthol, fenchone, nicotine, ephedrine, 2-amino-1-butanol, mandelic-acid and esters, lactic acid and esters, camphoric acid and esters, camphene-10-sulfonic acid and esters, Mosher's acid, tartaric acid and esters such as mentyl-, dodecyl-, natural and artificial α-amino acids and derivates, sugars and derivates (e.g. vitamin C).

For embodiments of the present invention-employing an oil-in-water (o/w) dispersion, microemulsion droplets are advantageously formed with the aid of one or more alcohols added to the dispersion. Such alcohols include iso-butanol, 1-butanol, 2-butanol, 2-pentanol, 2-hexanol, 2-octanol, cyclopentanol, cyclohexanol, benzylalcohol, terpineol and furfurylalcohol. These alcohols will be present in the dispersion in an amount ranging from 2–80% by weight, preferably 3–50%, more preferably 5–40%, Formation of the microemulsion droplets in o/w dispersions may also be aided by adding one or more nonionic and/or anionic surfactants to the dispersion. Nonionic surfactants include ethoxylated castor oils, sugar esters, sugar ethers, ethoxylated alkanols, ethoxylated alkylphenols, acetylenic diols (e.g. 2,4,7,9 tetramethyl-5-decyn-4,7-diol). Anionic surfactants include alkylarenesulfonates e.g. dodecylbenzenesulfonates, sulfosucciantes, e.g. dioctylsulfosuccinates, (ethoxylated) alkylsulfates (e.g.

laurylsulfate, laurylethersulfates), [mono- or di-(tristyrylphenyl)]phosphates. The surfactants may be present in the dispersion in an amount ranging from 1–60% by weight, preferably 3–40%, more preferably 5–30%.

Further optional additives to o/w dispersions include toluene, xylene, chlorobenzene, nitrobenzene and aniline, in amounts ranging from 3–40% by weight of the dispersion, preferably 5–20%, together with N-(methyl-,ethyl- or propyl-) pyrrolidone, trimethylphosphate, DMSO, DMF dimethylacetamid and THF in amounts ranging from 5–60% by weight of the dispersion, preferably 10–40%, The third phase of the system comprises a surface upon which the desired substance can crystallise. Typically this surface will comprise or be formed from crystals of the desired compound, which are conveniently introduced into the system by seeding with the desired compound or by spontaneous crystallisation of the desired compound due to the chemical potential for such crystallisation.

The three phase system according to the present invention will preferably contain one or more surface active agents, i.e. solubilizers, surfactants and/or dispersants which assist in forming and stabilizing the microemulsion droplets of the first phase and the crystals of the third phase. Such solubilizers, surfactants and/or dispersants will be chosen according to the nature of the dispersion, and can be nonionic, anionic and/or cationic.

Below is set forth a non-exhaustive list of suitable solubilizers, surfactants and dispersants:

I. Non-ionic surfactants including ethoxylated or ethoxylated and propoxylated [alkylphenols, di- or tristyrylphenols, oils (e.g. castor oils), oleic acids, fatty or synthetic alcohols, fatty or synthetic amines or amides]; ethoxylated or ethoxylated and propoxylated sugar esters (e.g. sorbitan monolaurate, POP-POE glycerol sorbitan fatty esters) of e.g. (ethoxylated) oleic or fatty acids; sucroglycerides; ethoxylated sugar ethers (e.g. alkyl polyglucoside); silicone surfactants (e.g. silicone glycol copolymers with polyoxyalkylene polymethylsiloxane units; acetylenic diols (e.g. 2,4,7,9-tetramethyl-5-decyn-4,7-diol); polyethylene oxide/polypropylene oxide copolymers; acrylic polymers; polyvinyl alcohol; modified polyesters.

II. Anionic surfactants including alkylarene sulphonates (eg. dodecyl benzene sulfonates); alkyldiphenyl ether sulfonate salts; sulfosuccinates (eg. dioctyl sulfosuccinates); (ethoxylated) alkyl sulfates (e.g. lauryl sulfates, lauryl ether sulphates); (fluorinated) mono-, di- and/or triesters of phosphorous acid and salts thereof (as alcohols may be used e.g. (ethoxylated) alkyl-, di- or tristyrylphenols, alkanols such as $C_{8^-18}$—OH, 2-ethylhexyl- or lauryl alcohol); ethoxylated di- or tristyrylphenol sulfates.

III. Cationic surfactants including protonated (ethoxylated) primary, sec., or tert. amines or diamines: (ethoxylated) quarternary ammonium salts (e.g. trimethyl oleyl ammonium chloride)

IV. amphoteric surfactants including N-coco-beta-aminobutyric acid; amine oxides.

V. Solubilizers including naphtalene sulfonate; cumol sulfonate.

VI. Dispersants including phenylsulfonates; (alkyl-) naphtalene sulfonates; polycarboxylates; acrylic polymers; maleic acid/acrylic acid coploymers; maleic acid/methyl vinyl ether copolymers; polyvinyl pyrrolidone; polyvinyl pyrrolidone/polystyrene copolymers; (ethoxylated) lignin sulfonates.

It is advantageous, though not necessary, that an equilibrium of the activities of the remaining substances in the aggregate mixture is maintained between the first phase and the second phase. This is the case when pure crystals of the desired substance grow and the nucleation of non-desired crystal can be inhibited completely or spontaneously formed nuclei of non-desired crystals are removed by filtration, ultrasound, adsorption and the like. Then the separation process of this application is highly selective since only the desired substance flows continuously from the first phase through the second phase to the third phase. The undesired substances remain in the first phase since no undesired substance flows from the second to the third phase thus maintaining an equilibrium of activities of the undesired substances between the first and second phases.

The process of the present invention can, however, be practiced even where there is potential for flow of one or more of the remaining substances to the third phase. In this event, high levels of purity of the desired substance can still be obtained if the flow for the desired component is significantly higher than for the undesired impurities.

Even if the obtained purity is the same or lower than in a conventional 2-phase-crystallisation process, there may be still considerable economic interest in conducting the crystallisation as a 3-phase-crystallisation process, since loss of a desired substance in mother liquid can be considerably lower than in conventional processes.

Seeding with the desired substance may take place by various methods. The seed crystals may be selected according to quantity, size, habitus, modification, molecular species (different compounds, homologues, isomers, diastereomers, enantiomers) and/or ionic compounds. The seed crystals may also constitute mixtures of different ionic or molecular compounds (e.g. homologues, isomers, diastereomers or enantiomers) or may consist of crystals of different modifications, habitus, size, in different quantities.

During seeding, it is usually desirable to inhibit crystallisation of non-seeded species, which may be caused by primary or secondary nucleation.

Primary nucleation can be inhibited by a proper degree of supersaturation, by a proper choice and amount of surfactants and solvents, especially solvents which serve as relatively good solvents for the aggregate mixture in the first phase but show also—especially at higher temperature due to the higher entropy of the system—a solubility of more than 5% in the second phase at r.t., by choice of temperatures, viscosities and agitation.

Just formed nuclei can be immediately removed e.g. by ultrasound or by removing these tiny seeds by a filtration process or a re-homogenization process with ultrasound or heat after the mother liquid has been filtered from the growing seeded crystals e.g. in a continuous recycle mode and/or by inhibiting secondary nucleation.

Secondary nucleation can be inhibited by proper, gentle agitation and also by growing selectively more compact crystal forms, which do not have a strong tendency to break into pieces, which serve as new seed crystals for the desired components and/or offer spots and/or surfaces due to non-homogeneous way of growth or breakage of easily breakable crystals, where undesired crystals may start to grow.

The crystal growth rate can be optimised by the generated chemical potential for the crystallisation process which is dependent on the degree of supersaturation, by the normally limited solubility of the desired substance in the second phase, which can be controlled by a proper choice of solvents and additives, or by a proper microenvironment adsorbed on the crystal surface, e.g. surfactants, dispersants, polymers which may serve as a retarding and/or selective layer or membrane.

This crystallisation process can be performed at an optimum temperature within wide limits (e.g. −20° C. to +80° C.). The additives previously mentioned may also serve as antifreeze agents.

This crystallisation process can further be optimised by a proper agitation during the crystallisation (e.g. by stirring, shaking, pumping and/or ultrasound).

After the crystallisation is complete, the precipitate can be obtained by simple filtration and subsequent thorough washing with a solvent e.g. similar to or the same as phase 2. For example, precipitate from an o/w microemulsion may be washed with water, whereas precipitate from a w/o microemulsion may be washed with oil to remove residual microemulsion, surfactant, dispersant, solvent etc. The solvent may further contain additional surfactant or dispersant to aid complete re-dispersion of the crystalline precipitate in the washing liquid, thus making the washing process more efficient.

Various embodiments of the three phase system of this invention are contemplated.

The first and second phases may comprise an "oil-in-water" (o/w) or a "water-in-oil" (w/o) dispersion. "Oil" as used herein refers to a poorly water soluble solvent e.g. any of the poorly water-soluble solvents that have been previously mentioned in this application. O/w and w/o dispersions and methods for forming them are per se known in the art. The aggregate mixture may be conveniently combined with one or more non-polar, amphiphilic or polar solvents such as those previously mentioned to form a supersaturated solution of the aggregate mixture; or the aggregate mixture may be "oil", itself.

The surface active agent will normally be present in an amount ranging from 0.1 to 99% by weight preferably 3 to 33%.

Preferably the temperature of the dispersion is kept constant. Optionally the dispersion can be agitated to enhance the crystallisation process, or treated with gentle ultrasound to aid clean crystal growth and to destroy spontaneously formed nuclei.

A suitable means of carrying out the invention is as follows: A first phase comprising aggregate mixture, optionally dissolved in a solvent or solvent mixture, which is at least in part not-soluble in the second phase is combined with a second phase and a surface active agent. Further additives may also be added where desirable, including dispersants, antifoaming agents, solubility regulating additives, antifreeze agents and the like.

The phases are agitated to accelerate the formation of a dispersion of microemulsion droplets of diameter less than 500 nm, preferably 5–200 nm, of the first phase in the second phase.

After the dispersion is brought to the desired crystallisation temperature, a suspension of one or more species of seed crystals chosen according to quantity, size, habitus, purity, modification, and molecular and/or ionic composition for the crystallisation of the desired substance of the aggregate mixture is added. The seeded component then crystallizes selectively within a given period of time while the dispersion is either left standing, or is agitated (shaken or stirred or pumped or treated moderately with ultrasound)

The separation process of the present invention may be carried out as a batch process or a continuous process. One means for carrying out the process continuously is illustrated with reference to FIG. 1.

The aggregate mixture is introduced as coarse solid particles (or in another appropriate form, suitable for use in the equipment according to FIG. 1 or modifications thereof such as a coarse solid carrier coated by an aggregate liquid mixture, or as a viscous or pasty mash or a liquid) through entrance 2 of an appropriate container or column 3 batchwise or continuously and may be continuously transported there through. The aggregate mixture may also be introduced as a liquid mixture or a suspension, which is pumped along e.g. a fine sieve or a porous or by diffusion penetrable membrane, thus allowing that material is dissolved into the dispersion system of the 3-phase-crystallization from this solid barrier. The microemulsion and the feed aggregate mixture in the container or column 3 may be properly agitated by stirring, shaking, pumping and/or ultrasound etc. To supersaturate the microemulsion with the desired substance or with the aggregate mixture, the microemulsion and the feed aggregate mixture in the container or column 3 may be heated e.g. at a temperature greater than in the crystalliser or may be treated with ultrasound. If the aggregate mixture is more soluble than the crystal of the desired compound (e.g. supercooled melt, a glassy material or a more soluble modification), it may be sufficient to at least partially dissolve the aggregate mixture in the microemulsion at crystallisation temperature to obtain a sufficient supersaturation.

Crystallisation from the microemulsion 4 is carried out in a container 5, into which the third phase 6 may be introduced, e.g. in the form of a seed suspension, e.g. through an appropriate entrance 7. The dispersion in the crystalliser is kept preferably at a temperature below that in the feed vessel 3, e.g. at 20° C. A small fraction of the microemulsion is pumped through a filter 8 in order to withhold any crystals formed in the crystalliser, optionally through a heat exchanger 9 to increase the temperature of the microemulsion to that of the feed vessel 3 and then through the feed vessel 3 with the aggregate mixture 1 to be purified. After contact of the microemulsion with the aggregate mixture 1 over a sufficient column length or a sufficient length of time, the reloaded microemulsion is pumped through filter 10 and optionally the heat exchanger 9a, to adjust the temperature of the microemulsion back to its original temperature (in this example from 50° C. to 20° C.). The dispersion in container 5 is conveniently stirred, employing a conventional stirrer 12. It may also be treated by moderate ultrasound as means to immediately destroy nuclei formed by spontaneous nucleation.

Crystals formed may be separated by conventional means, employing e.g. a crystal separator 13 and a crystal carry out 14 (not shown) or may be classified and separated from the dispersion by a sifter, by a cyclone or by centrifugation. The crystals may also be further separated by sieving or centrifugation into different classes of sizes. The different size classes may contain different crystal species (modifications, isomers, compounds) according to the specific 3-phase-crystallization-process. The crystals may be washed with a liquid with a polarity e.g. similar to phase 2, where the crystals are poorly soluble. Waste material 15 may be carried out continuously or batchwise.

The thus described equipment for continuous supersaturation by heating/cooling may be adapted in conventional manner to an equipment suitable for continuous supersaturation employing ultrasound in addition to or instead of heating/cooling.

Modifications to this equipment are possible and to be considered within the scope of the present invention. For example, the aggregate mixture 1 and the microemulsion 4 may move cocurrently, in which case the phases should preferably move with different velocity to allow optimum use of the aggregate mixture 1 and optimum supersaturation of the microemulsion 4.

EXAMPLES

All compounds are used without further purification. The surfactants Rhodafac RE 610 and Soprophor FL are obtainable from Rhône-Poulenc, Surfynol 465 from Air Products, Synperonic NP 10 from ICI and Na-Laurylsulfate from Fluka. For agitation a shaking machine is used (Buhler KL Tuttlingen). Purities of the resulting crystals are measured by using an PolarMonitor polarimeter (IBZ Hannover; ethanol as solvent; the total crystal quantity was dissolved; 1 ml cell; 20° C.)

Preparation of Example 449

45 mg of (R,R)- and (S,S)-Hydrobenzoin (HBZ; purity >97%) are dissolved in 1 ml of a mixture of 20% v/v 2-hexanol, 12% v/v Rhodafac RE 610, 6% v/v Soprophor FL and 62% v/v water by heating to 80° C. in a 5 ml vial. After the HBZ is completely dissolved the microemulsion is cooled down to room temperature and agitated using a shaking machine (420 rpm). During two hours no spontaneous crystallisation could be observed. The mixture is then seeded with two drops of a dilute, finely ground suspension of pure (S,S)-(−)-HBZ crystals grown under similar conditions. After 2 hours of agitation the resulting crystals are filtered off, washed with water and dried in a gentle nitrogen stream.

The examples shown in Table A below are prepared following the procedure for example 449, with the modifications in components and the results indicated.

Preparation of Example 309

35 mg of R- and S-1,1'-bi-(2-naphthol) (BNA; purity 99%) are dissolved in 1 ml of a mixture of 9% N-methylpyrrolidone, 9% v/v 2-hexanol, 10% v/v Rhodafac RE 610, 5% v/v Soprophor FL and 68% v/v water by heating to 50° C. in a 5 ml vial. After the BNA is completely dissolved, the microemulsion is cooled down to r.t. and agitated with a shaking machine (350 rpm). During two hours, no spontaneous cyrstallisation can be observed. The mixture is then seeded with two drops of a dilute, finely ground suspension of pure R(+)-BNA crystals grown under similar conditions. After two hours of shaking, the resulting crystals are filtered off, washed with water and dried in a gentle nitrogen stream.

Yield: 5.4 mg (15.4%) colourless crystals

Purity: >90% R.

TABLE A

| No | solvent vol. [ml] | HBZ [mg] | alcohol | (vol %) | amphiphilic solvent | (vol %) | surfactant 1 | (vol %) |
|---|---|---|---|---|---|---|---|---|
| 312 a | 2 | 35 | pentanol | 10 | | | Rhodafac RE 610 | 8 |
| 312 f | 2 | 35 | pentanol | 10 | | | Rhodafac RE 610 | 8 |
| 312 h | 2 | 35 | pentanol | 10 | | | Rhodafac RE 610 | 8 |
| 312 g | 2 | 35 | pentanol | 10 | | | Rhodafac RE 610 | 8 |
| 312 i | 2 | 35 | pentanol | 10 | | | Rhodafac RE 610 | 8 |
| 312 j | 2 | 35 | pentanol | 10 | | | Rhodafac RE 610 | 8 |
| 312 k | 2 | 35 | pentanol | 10 | | | Rhodafac RE 610 | 8 |
| 312 l | 2 | 35 | pentanol | 10 | | | Rhodafac RE 610 | 8 |
| 312 m | 2 | 35 | pentanol | 10 | | | Rhodafac RE 610 | 8 |
| 312 n | 2 | 35 | pentanol | 10 | | | Rhodafac RE 610 | 8 |
| 326 b | 2 | 70 | pentanol | 20 | | | Rhodafac RE 610 | 12 |
| 326 c | 1 | 35 | pentanol | 20 | | | Rhodafac RE 610 | 12 |
| 449 b | 1 | 40 | hexanol | 20 | | | Rhodafac RE 610 | 12 |
| 449 c | 1 | 45 | hexanol | 20 | | | Rhodafac RE 610 | 12 |
| 449 d | 1 | 50 | hexanol | 20 | | | Rhodafac RE 610 | 12 |
| 478 a | 1 | 50 | hexanol | 20 | ethanol | 5 | Rhodafac RE 610 | 12 |
| 478 c | 1 | 50 | hexanol | 20 | ethanol | 5 | Rhodafac RE 610 | 12 |
| 478 d | 1 | 50 | hexanol | 20 | ethanol | 5 | Rhodafac RE 610 | 12 |
| 381 a | 1 | 50 | hexanol | 20 | DME | 5 | Rhodafac RE 610 | 12 |
| 381 b | 1 | 60 | hexanol | 20 | DME | 5 | Rhodafac RE 610 | 12 |
| 381 c | 1 | 60 | hexanol | 20 | DME | 5 | Rhodafac RE 610 | 12 |
| 381 e | 1 | 55 | hexanol | 20 | DME | 5 | Rhodafac RE 610 | 12 |
| 381 g | 1 | 50 | hexanol | 20 | DME | 5 | Rhodafac RE 610 | 12 |
| 381 j | 1 | 50 | hexanol | 20 | DME | 5 | Rhodafac RE 610 | 12 |
| 469 a | 1 | 60 | hexanol | 20 | DME | 5 | Rhodafac RE 610 | 16 |
| 469 b | 1 | 60 | hexanol | 20 | DME | 5 | Rhodafac RE 610 | 16 |
| 469 c | 1 | 60 | hexanol | 20 | DME | 5 | Rhodafac RE 610 | 16 |
| 357 a | 1 | 40 | pentanol | 10 | DME | 5 | Rhodafac RE 610 | 12 |
| 357 b | 1 | 50 | pentanol | 10 | DME | 5 | Rhodafac RE 610 | 12 |
| 491 a | 1 | 60 | pentanol | 20 | DME | 5 | Rhodafac RE 610 | 12 |
| 491 b | 1 | 60 | pentanol | 20 | DME | 5 | Rhodafac RE 610 | 12 |
| 492 | 1 | 50 | hexanol | 20 | DME | 5 | Synperonic NP 10 | 9 |
| 494 | 1 | 50 | hexanol | 20 | DME | 5 | Rhodafac RE 610 | 9 |
| 491 | 1 | 50 | hexanol | 20 | DME | 5 | Synperonic NP 10 | 9 |
| 493 | 1 | 50 | hexanol | 20 | DME | 5 | Surfinol 465 | 9 |
| 495 | 1 | 50 | hexanol | 20 | DME | 5 | Synperonic NP 10 | 9 |

| No | surfactant 2 | (vol %) | no spontaneous crystallisation for | at temperature | yield [mg] | [%] | purity [% S] | comment |
|---|---|---|---|---|---|---|---|---|
| 312 a | Soprophor FL | 4 | >24 h | 18° C. | 1.6 | 4.6 | 97.4 | |
| 312 f | Soprophor FL | 4 | >3 h | 18° C. | 6.8 | 19.4 | 53.0 | |
| 312 h | Soprophor FL | 4 | >3 h | 18° C. | 2.6 | 7.4 | 57.0 | |
| 312 g | Soprophor FL | 4 | >3 h | 18° C. | 2.7 | 7.5 | 73.2 | |
| 312 i | Soprophor FL | 4 | >3 h | 18° C. | 2.9 | 8.3 | 56.5 | |

TABLE A-continued

| | | | | | | | | |
|---|---|---|---|---|---|---|---|---|
| 312 j | Soprophor FL | 4 | >1.5 h | 19° C. | 1.8 | 5.1 | 103.1 | |
| 312 k | Soprophor FL | 4 | >1.5 h | 19° C. | 1.5 | 4.3 | 89.1 | |
| 312 l | Soprophor FL | 4 | >1.5 h | 19° C. | 1.3 | 3.7 | 70.4 | |
| 312 m | Soprophor FL | 4 | >1 h | 19° C. | 2.1 | 6.0 | 76.5 | |
| 312 n | Soprophor FL | 4 | >1 h | 19° C. | 2.4 | 6.9 | 84.6 | |
| 326 b | Soprophor FL | 6 | >1 h | 18° C. | 1.0 | 1.4 | 92.5 | |
| 326 c | Soprophor FL | 6 | <2 h | 18° C. | 0.1 | 0.3 | — | spont. cryst.* |
| 449 b | Soprophor FL | 6 | >2 h | 20° C. | 0.2 | 0.5 | 92.5 | |
| 449 c | Soprophor FL | 6 | >2 h | 20° C. | 3.8 | 8.4 | 61.3 | |
| 449 d | Soprophor FL | 6 | >2 h | 20° C. | 3.6 | 7.2 | 92.8 | |
| 478 a | Soprophor FL | 6 | >1 h | 20° C. | 2.5 | 5.0 | 94.5 | |
| 478 c | Soprophor FL | 6 | >2 h | 20° C. | 2.5 | 5.0 | 101.4 | |
| 478 d | Soprophor FL | 6 | >2 h | 20° C. | 4.8 | 9.6 | 61.6 | |
| 381 a | Soprophor FL | 6 | >0.5 h | 17° C. | 2.9 | 5.8 | 82.3 | |
| 381 b | Soprophor FL | 6 | >2 h | 18° C. | 2.4 | 4.0 | 98.5 | |
| 381 c | Soprophor FL | 6 | >2 h | 18° C. | 2.5 | 4.2 | 94.4 | |
| 381 e | Soprophor FL | 6 | >2 h | 20° C. | 1.2 | 2.2 | 96.3 | |
| 381 g | Soprophor FL | 6 | >1 h | 20° C. | 1.2 | 2.4 | 94.4 | |
| 381 j | Soprophor FL | 6 | >12 h | 12° C. | 3.3 | 6.6 | 99.4 | |
| 469 a | Soprophor FL | 8 | >2 h | 20° C. | 1.5 | 2.5 | 98.4 | |
| 469 b | Soprophor FL | 8 | >2 h | 20° C. | 4.1 | 6.8 | 99.4 | |
| 469 c | Soprophor FL | 8 | >2 h | 20° C. | 3.7 | 6.2 | 97.5 | |
| 357 a | Soprophor FL | 6 | >1 h | 18° C. | 0.3 | 0.75 | 83.8 | |
| 357 b | Soprophor FL | 6 | <1 h | 18° C. | 5.5 | 11.0 | — | spont. cryst.* |
| 491 a | Soprophor FL | 6 | >2 h | 20° C. | 4.2 | 7.0 | 94.4 | |
| 491 b | Soprophor FL | 6 | <2 h | 20° C. | 4.5 | 7.5 | — | spont. cryst.* |
| 492 | Soprophor FL | 9 | >1 h | 20° C. | 2.0 | 4.0 | 96.2 | |
| 494 | Aerosol OT 70 PG | 9 | <1 h | 20° C. | 1.0 | 2.0 | — | spont. cryst.* |
| 491 | Aerosol OT 70 PG | 9 | <1 h | 20° C. | 1.0 | 2.0 | — | spont. cryst.* |
| 493 | Na-Laurylsulfat | 9 | <1 h | 20° C. | 2.0 | 4.0 | — | spont. cryst.* |
| 495 | Na-Laurylsulfat | 9 | <1 h | 20° C. | 2.0 | 4.0 | — | spont. cryst.* |

*spontaneous crystallisation, therefore no seeding

What is claimed is:

1. A process for separating a desired substance from an aggregate mixture in which process a three phase dispersion is formed with (i) a first phase comprising droplets containing the aggregate mixture, (ii) a second phase comprising a liquid transport phase, and (iii) a third phase comprising a surface upon which the desired substance can crystallize, whereby a chemical potential exists for crystal growth of the desired substance in the third phase thereby creating a flow of the desired substance from the first phase through the second phase to the third phase where the desired substance crystallizes, wherein the Gibbs free enthalpy of formation ($\Delta G$) of the droplets is <0.

2. A process according to claim 1 wherein the first and second phases together form a microemulsion.

3. A process according to claim 1 wherein the droplets have a diameter of less than 500 nm.

4. A process according to claim 1 wherein the dispersion further comprises a solvent.

5. A process according to claim 1 wherein the dispersion further comprises an alcohol.

6. A process according to claim 1 wherein the dispersion further comprises a surface active agent.

7. A process according to claim 1 wherein the third phase is formed by introducing seed crystals of the desired substance into the second phase.

8. A process according to claim 1 wherein the first and second phases comprise an oil-in-water dispersion or a water-in-oil dispersion.

9. A process according to claim 1 carried out in batch operation.

10. A process according to claim 1 carried out in continuous operation.

* * * * *